US008234492B2

(12) United States Patent
Kim et al.

(10) Patent No.: US 8,234,492 B2
(45) Date of Patent: Jul. 31, 2012

(54) METHOD, CLIENT AND SYSTEM FOR REVERSED ACCESS TO MANAGEMENT SERVER USING ONE-TIME PASSWORD

(75) Inventors: Dae-Won Kim, DaeJeon (KR); Seong-Woon Kim, DaeJeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1115 days.

(21) Appl. No.: 12/116,289

(22) Filed: May 7, 2008

(65) Prior Publication Data

US 2009/0158048 A1 Jun. 18, 2009

(30) Foreign Application Priority Data

Dec. 14, 2007 (KR) .................. 10-2007-0131205

(51) Int. Cl.
*H04L 9/32* (2006.01)
(52) U.S. Cl. ........ 713/168; 713/183; 713/184; 713/185; 380/44; 726/20; 709/203
(58) Field of Classification Search .......... 713/183–185, 713/168; 380/44; 726/20; 709/203
See application file for complete search history.

(56) References Cited

U.S. PATENT DOCUMENTS

| 7,272,230 | B2* | 9/2007 | Sasaki ........................... 380/278 |
| 2007/0245150 | A1* | 10/2007 | Lu et al. ......................... 713/184 |
| 2008/0077530 | A1* | 3/2008 | Banas et al. ..................... 705/50 |

FOREIGN PATENT DOCUMENTS

| KR | 10-0383442 | 4/2003 |
| KR | 10-0449572 | 9/2004 |

(Continued)

OTHER PUBLICATIONS

Differentiated Virtual Passwords, Secret Little Functions, and Codebooks for Protecting Users From Password Theft .Xiao, Y.; Li, C.-C.; Lei, M.; Vrbsky, S. V.; Department of Computer Science, University of Alabama, Tuscaloosa, AL 35487 USA.Systems Journal, IEEE (1932-8184) 2012. Iss.99;p. 1-1.*

(Continued)

*Primary Examiner* — Thanhnga B Truong
*Assistant Examiner* — Angela Holmes
(74) *Attorney, Agent, or Firm* — Staas & Halsey LLP

(57) ABSTRACT

Provided are a method, client and system for reservation access to a management server using a one-time password. A generated personal identification number (PIN) is transmitted to the management server when a reservation time comes. The management server generates a random number encrypted using the PIN and transmits the random number to the client. The random number encrypted using the PIN is received, the received random number is encrypted by a symmetric-key algorithm using a client secret key and is transmitted to the management server. The management server receives the random number encrypted using the client secret key, and decrypts the received random number using a server secret key and the PIN. A random number before the encryption using the PIN is compared with a decrypted random number, and access of the client is accepted if the two numbers are identical. Automatic access to a system employing a one-time password authentication method can be made through an arbitrary route according to previously reserved settings to perform information collection and to process specific functions in the case where a system manager is unable to directly access the system through a determined route because of temporal and spatial limitations.

10 Claims, 3 Drawing Sheets

FOREIGN PATENT DOCUMENTS

| | | |
|---|---|---|
| KR | 10-2005-0071768 | 7/2005 |
| KR | 10-2006-0069611 | 6/2006 |
| KR | 10-2007-0098222 | 10/2007 |
| WO | WO 2008031143 A1 * | 3/2008 |

OTHER PUBLICATIONS oPass: A User Authentication Protocol Resistant to Password Stealing and Password Reuse Attacks, Sun, H.-M.; Chen, Y.-H.; Lin, Y.-H.; Department of Computer Science, National Tsing Hua University, HsinChu, Taiwan R.O.C.Issue Date: Apr. 2012 vol. 7 Issue:2.*

Notice of Allowance issued Dec. 30, 2009 in corresponding Korean Application No. 10-2007-0131205.

* cited by examiner

METHOD, CLIENT AND SYSTEM FOR REVERSED ACCESS TO MANAGEMENT SERVER USING ONE-TIME PASSWORD

CROSS-REFERENCE TO RELATED APPLICATIONS

This application claims priority under 35 U.S.C. §119 to Korean Patent Application No. P2007-131205, filed in Korea on Dec. 14, 2007, the disclosure of which is incorporated herein by reference in its entirety.

BACKGROUND OF THE INVENTION

1. Field of the Invention

The present disclosure relates to a method, client and system for reservation access to a management server using a one-time password, and more particularly, to a method, client and system for reservation access to a management server using a onetime password, which are capable of automatically accessing to the system employing a one-time password authentication method through an arbitrary route according to previously reserved settings in the case where a system manager is unable to directly access the system through a determined route because of temporal and spatial limitations, thereby collecting information and processing a specific functions.

2. Description of the Related Art

A related art authentication method for permitting only authenticated users to gain system access is implemented by a typical user identification (ID)/password. However, the related art ID/password method fails to completely block password guessing no matter how complex the password is, and is vulnerable to password leakage because the password is transmitted over network. The security vulnerability of the related art method increases as the danger of password exposure increases due to development of hacking skills and limitations of user management. For this reason, the need for more secure security authentication methods arises than the related art IP/password method depending on the user management.

In response, a one-time password method using a password that is usable only once has been developed. A representative example of the onetime password method is a challenge/response method of using a challenge code and a response code, which has been implemented to make password guessing by outsiders impossible.

The related art security authentication system employing the challenge/response method includes an authentication system that generates and authenticates a challenge code, and a portable device of a small electronic calculator type, for generating a response code of a user.

A user accesses the authentication system of a system intended to access via the Internet of a computer, and inputs a user ID to login to the corresponding system.

At this time, the authentication system generates a challenge code with a user ID and a random number, and sends the challenge code back to the user.

The user inputs the challenge code received from the authentication system to a response code generator provided in the computer, and the response code generator generates a response code on the basis of the challenge code and displays the response code on the user computer.

Thereafter, the user inputs the displayed response code, i.e., a one-time password. Then, the authentication system compares a value generated by itself and the user input value, i.e., the one-time password. If the two values coincide with each other, the authentication system permits the user to access an internal system or an application.

Such a reinforced authentication method is being applied to various systems and also partially to a sensor application system. In the sensor application system, a sensor that changes physical quantity into an electrical signal is installed in an environment limited in, e.g., time and space. Particularly, in the case where the system employs a device having a core micro control function such as a baseboard management controller (BMC), system data collection, system monitoring and system management can be performed through sensor detection and remote system hardware via a client and a user interface of a server in an intelligent platform management interface (IPMI) structure.

In the sensor application system, because of the temporal and spatial limitations in use, the client automatically accesses a system management server according to reserved settings to perform system data collection and system management and monitoring. This is more common than the case where the user directly accesses the system and controls system functions manually. Also, even when the user directly accesses the system, a specific client or a random client may be used to access the system.

Thus, a separate device that can generate a response code in response to a challenge code and a process of inputting a response code are needed for each individual user if the security authentication system employing the related art challenge/response method is applied to the sensor application system. However, the security authentication system employing the related art challenge/response method is limited in system access through an arbitrary client and in automated system access based on reserved settings. Thus, it is difficult to apply such a security authentication system to the sensor application system as it is.

SUMMARY

Therefore, an object of the present invention is to provide a method, client and system for reservation access to a management server using a one-time password, which are capable of automatically accessing to the system employing a one-time password authentication method through an arbitrary route according to previously reserved settings in the case where a system manager is unable to directly access the system through a determined route because of temporal and spatial limitations, thereby collecting information and processing a specific functions.

To achieve these and other advantages and in accordance with the purpose(s) of the present invention as embodied and broadly described herein, a method for reservation access to a management server using a one-time password of a sensor application system, which is generated by a client in accordance with an aspect of the present invention includes the steps of: (a) transmitting a generated personal identification number (PIN) to the management server when a reservation time comes; (b) generating, at the management server, a random number encrypted using the PIN, and transmitting the random number to the client; (c) receiving the random number encrypted using the PIN, encrypting the received random number by a symmetric-key algorithm using a client secret key, and transmitting a random number encrypted using the client secret key to the management server; (d) receiving, at the management server, the random number encrypted using the client secret key, and decrypting the received random number using a server secret key and the PIN; and (e) comparing a random number before the encryption using the PIN with a decrypted random number, and accepting access of the client if the two numbers are identical.

The client secret key and the server secret key may be different keys one of which is used for decryption if the other one is used for encryption. The step (d) may include the steps of: (d-1) determining a client that has sent the encrypted random number; and (d-2) searching for a PIN previously sent by the determined client.

The step (e) may include the step of: (e-1) denying access of the corresponding client if the two numbers are not identical.

To achieve these and other advantages and in accordance with the purpose(s) of the present invention, a system for reservation access to a management server using a one-time password in accordance with another aspect of the present invention includes: an authentication server for allocating a one-time password to an individual client by using a personal identification number (PIN) and a client secret key for each client; a management server for managing a sensor application system by using a board management controller; and a client for receiving the one-time password from the authentication server to make reservation access to the management server. The management server receives a server secret key corresponding to the client secret key from the authentication server to accept access of the corresponding client.

The authentication server and the management server may be configured as one device or as separate devices. The client may be a user terminal such as a mobile phone, a personal digital assistant (PDA), a portable media player (PMP), a personal computer (PC) and a notebook computer.

The authentication server may include: a cryptographic block for providing the client secret key and the server secret key; and a PIN generator for generating the PIN for each client. The PIN generator may generate the PIN by referring to periodic data of a sensor, and the periodic data may include voltage data and time data.

The management server may include: a board management controller for performing monitoring, management and control of the sensor application system; a system interface for providing an input/output interface between the sensor application system and a user; a random number generator for generating a random number using the PIN for each client provided by the authentication server; and a cryptographic block for decrypting the random number encrypted using the secret key for each client, by using the PIN and the server secret key. The management server may further include: a sensor controller for controlling a sensor and a sensor peripheral circuit; and a data storage for storing data associated with the sensor, the sensor peripheral circuit and the system.

To achieve these and other advantages and in accordance with the purpose(s) of the present invention, a client for reservation access to a management server of a sensor application system using a one-time password in accordance with another aspect of the present invention includes: a personal identification number (PIN) generator for generating a PIN; a user interface for providing user input/output for the reservation access, management and monitoring; a cryptographic block for encrypting a random number by a symmetric-key algorithm using a client secret key, the random number being generated from the PIN by the management server; and a board management controller for controlling operations of the PIN generator and the cryptographic block to make reservation access to the management server through the user interface according to reserved settings.

The client secret key and the server secret key may be different keys one of which is used for decryption if the other one is used for encryption.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
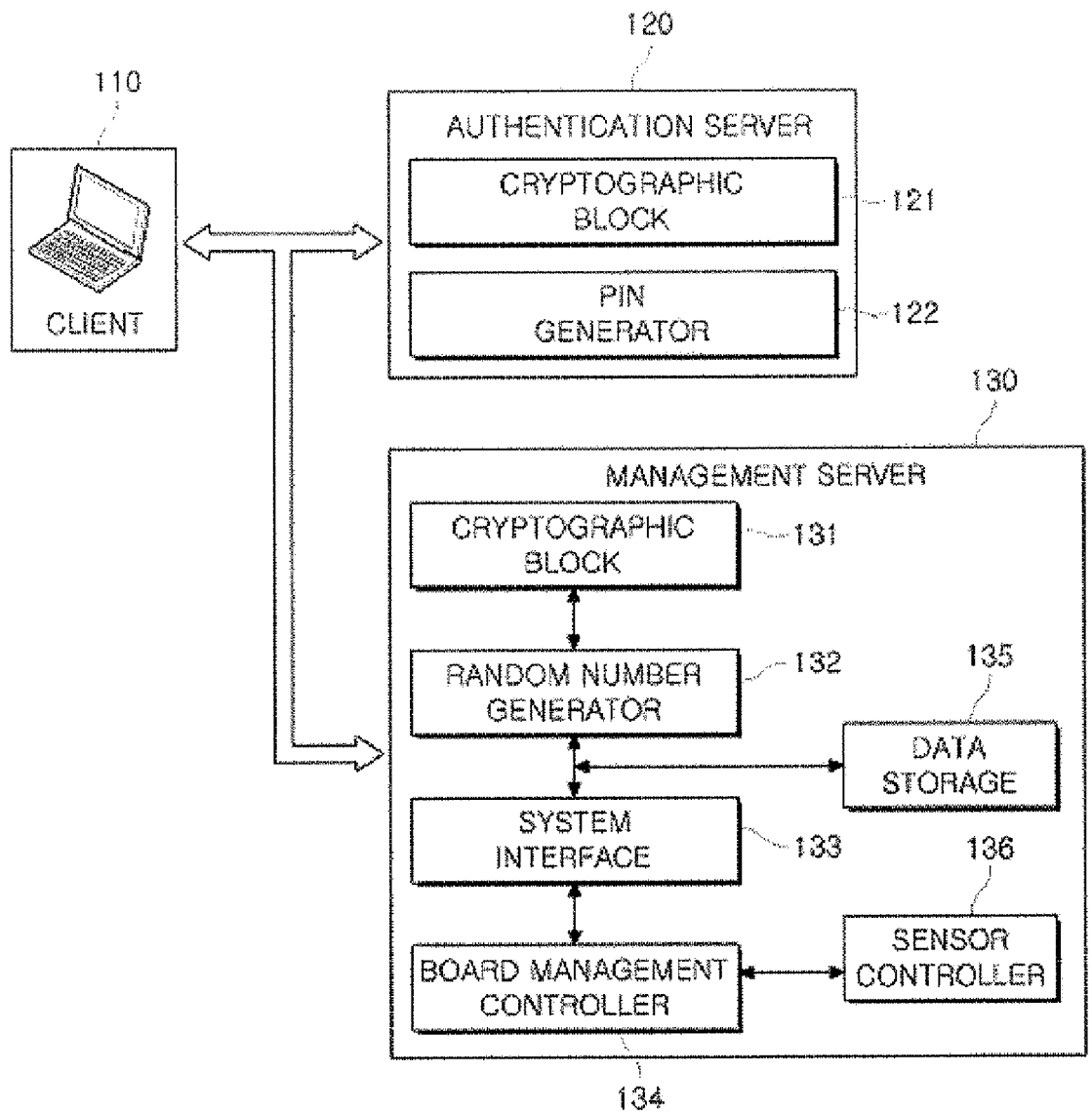
FIG. 1 is a block diagram illustrating a system for reservation access to a management server using a one-time password according to an embodiment of the present invention.

FIG. 1 is a block diagram illustrating a system for reservation access to a management server using a one-time password according to an embodiment of the present invention. As shown in FIG. 1, the system for reservation access to a management server using a one-time password includes an authentication server 120, a management server 130, and a client 110. The authentication server 120 allocates a one-time password to an individual client by using a personal identification number (PIN) for each client and a secret key. The management server 130 includes a board management controller to manage a sensor application system. The client 110 receives the one-time password from the authentication server 120 to make reservation access to the management server 130.

The authentication server 120, the management server 130 and the client 110 include respective transceivers (not shown) which transmit and receive data by being basically connected with one another over network.

The authentication server 120 allocates a one-time password of an individual client by using a PIN and a secret key, and includes a cryptographic block 121 for providing a client secret key and a server secret key, and a PIN generator 122 for generating a client PIN.

The cryptographic block 121 provides the client secret key and the server secret key using a symmetric-key algorithm to maintain security for data transmitted to the client 110.

The symmetric-key algorithm called a secret-key algorithm is used for cryptographic communication in data transmission/reception using secret keys known only to A and B, and interprets data transmitted therebetween on the basis of the fact that an encryption secret key being a client secret key and a decryption secret key being a server secret key are symmetrical with each other.

The PIN generator 122 generates a client PIN for each client.

The PIN generator 122 may generate the PIN by referring to periodic data of a sensor, which includes voltage data and time data.

The management server 130 includes a board management controller 134, a system interface 133, a random number generator 132, a cryptographic block 131, a sensor controller 136, and a data storage 135. The board management controller 134 performs monitoring, management and control of a sensor application system. The system interface 133 provides an input/output (110) interface between the sensor application system and a user. The random number generator 132 generates a random number using the PIN provided by the authentication server 120. The cryptographic block 131 decrypts a random number encrypted with the client secret key, using the client PIN and the server secret key. The sensor controller 136 controls a sensor and a sensor peripheral circuit. The data storage 135 stores data associated with the sensor, the sensor peripheral circuit, and the system.

The board management controller 134 is a device having a core micro control function such as a baseboard management controller (BMC). The board management controller 134 remotely detects system hardware and a sensor, according to reserved settings or modified settings of a system manager, through a client and a user interface of a server in an intelligent platform management interface (IPMI) structure, thereby supporting system data collection, monitoring and management.

The system interface 133 provides an I/O interface between the sensor application system and the user through the management server 130 or the client 110 in association with the board management controller 134.

The random number generator 132 encrypts a predetermined code by using a PIN provided by the authentication server 120 to generate a random number.

The cryptographic block 131 decrypts a random number encrypted with the client secret key and transmitted through the client 110 or the authentication server 120, using the client PIN and the server secret key, and transmits to the board management controller 134.

Then, the board management controller 134 compares the predetermined code, i.e., a random number before the encryption using the client PIN with the decrypted random number. If the predetermined is in accord with the decrypted random number, the board management controller 134 accepts access of the client 110.

The sensor controller 136 directly controls a sensor and a sensor peripheral circuit under the control of the board management controller 134.

The data storage 135 is a predetermined storage medium, and stores sensor/system-related collection data which the system manager has requested via the client 110 and the management server 130.

The authentication server 120 and the management server 130 may be configured as one device or as separate devices.

The client 110 is an arbitrary user terminal such as a mobile phone, a personal digital assistant (PDA), a portable media player (PMP), a personal computer (PC) and a notebook computer. The client 110 can automatically input a one-time password by receiving the PIN and the client secret key through the authentication server 120 according to reserved settings, thereby accessing the sensor application system.

Figure 2:
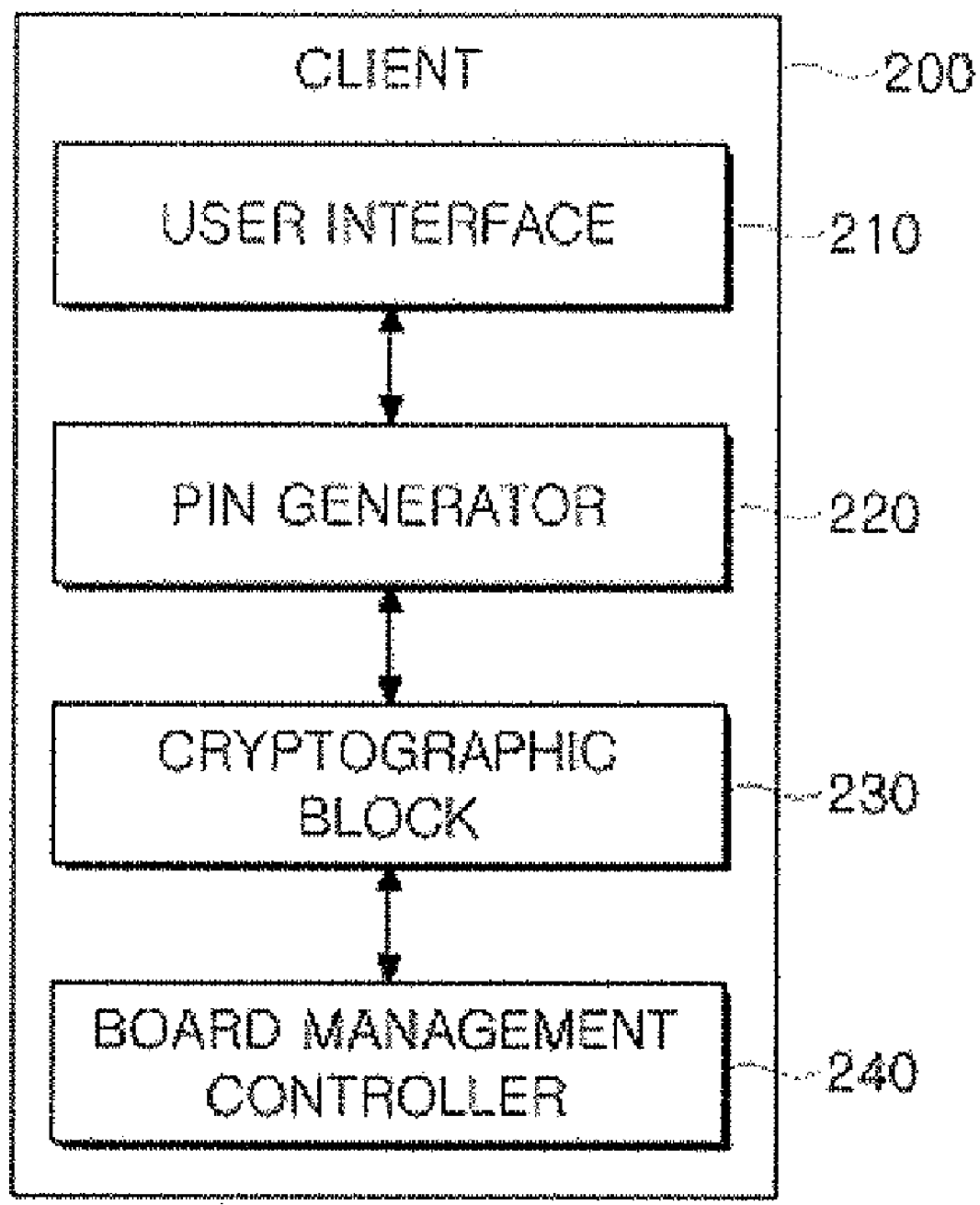
FIG. 2 is a block diagram illustrating a client for reservation access to a management server using a one-time password according to an embodiment of the present invention.

Alternatively, as shown in FIG. 2, a client 200 may be configured as a specific device inclusive of elements, which are the same as a cryptographic block 230 and a PIN generator 220 included in the authentication server 120, to thereby improve utility of the sensor application system. In this case, the authentication server 120 may be omitted from the system configuration because an authentication function of the authentication server 120 is unnecessary.

FIG. 2 is a block diagram illustrating a client for reservation access to a management server using a one-time password according to an embodiment of the present invention. As shown in FIG. 2 the client 200 for reservation access to a management server using a one-time password includes a PIN generator 220 for generating a PIN, a user interface 210, a cryptographic block 230 and a board management controller 240. The user interface 210 provides user I/O for the reservation access, management and monitoring. The cryptographic block 230 encrypts a random number by a symmetric-key algorithm using a client secret key. The random number is one that is generated by the management server 130 on the basis of a PIN. The board management controller 240 controls operations of the PIN generator 220 and the cryptographic block 230 to make reservation access to the management server 130 through the user interface 210 according to the reserved settings.

The PIN generator 220 generates a PIN for each client.

The user interface 210 makes reservation access to the management server 130 via a web browser or an application program to provide I/O for a user of managing and monitoring a system.

At this time, it may be preferable that the user interface 210 provides a user with time information transmitted through a time information providing device.

The cryptographic block 230 provides a client secret key, and encrypts a random number by the symmetric-key algorithm using the client secret key. The random number is one that is generated from the PIN by the management server 130.

The board management controller 240 controls operations of the PIN generator 220 and the cryptographic block 230 to make reservation access to the management server according to reserved settings through the user interface 210.

The client and system for reservation access to the management server using a one-time password according to the embodiments of the present invention can prevent a relay attack because of user authentication using a one-time password.

Thus, password prediction is almost impossible because allocation of the one-time password is dynamically calculated using the fact that sensor data values used for system management are different for each system and are periodically updated.

Figure 3:
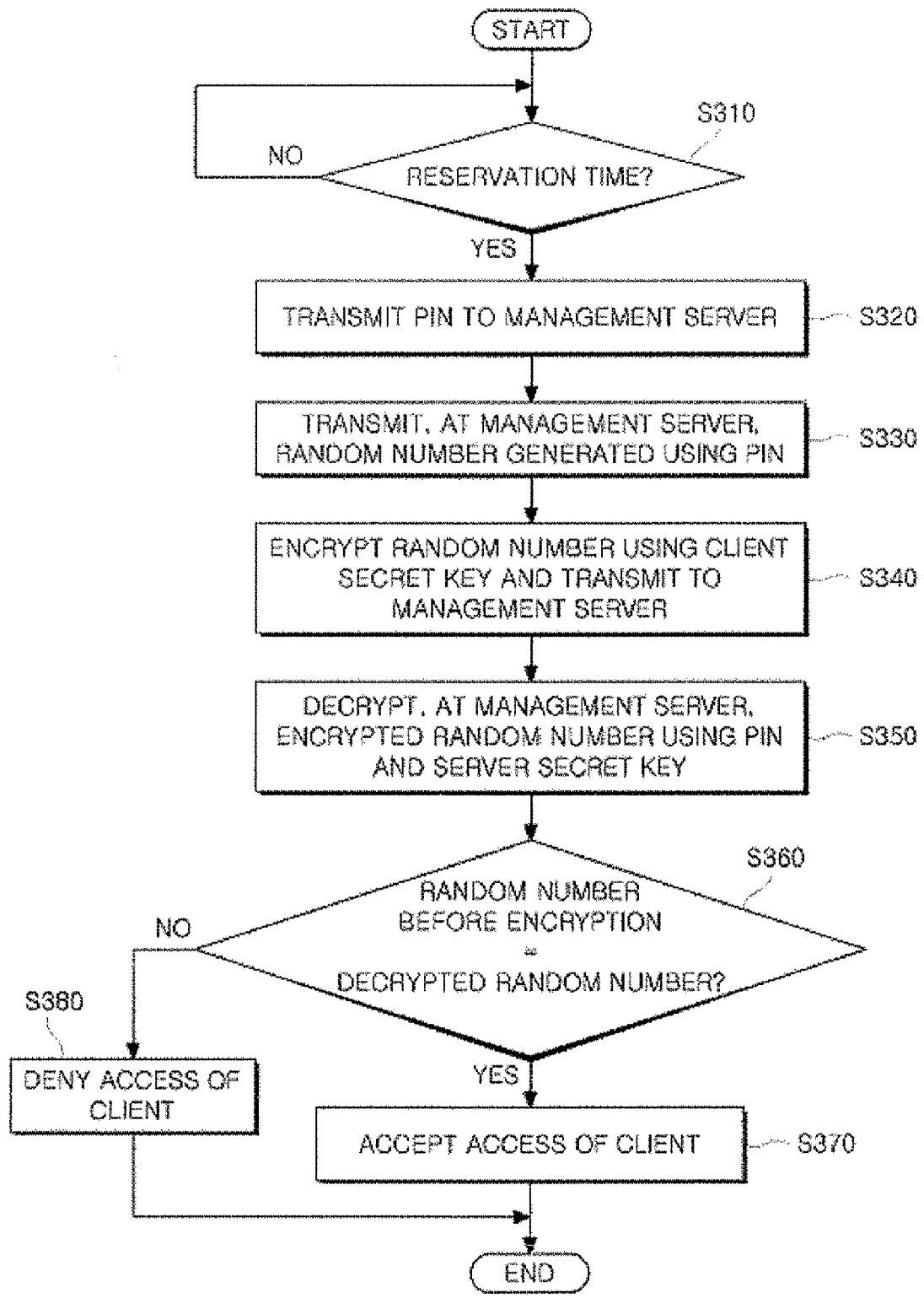
FIG. 3 is a flowchart illustrating a method for reservation access to a management server using a one-time password according to an embodiment of the present invention.

FIG. 3 is a flowchart illustrating a method for reservation access to a management server using a one-time password according to an embodiment of the present invention. The following description will be made with reference to FIG. 3.

If a reservation time preset by a user comes in operation S310, the client 110 or 200 transmits a PIN, which is generated from the authentication server 120 or from itself, to the management server 130 in operation S320.

In operation S330, the management server 130 receives the PIN, generates a random number by encryption using the PIN, and sends the random number to the client 110 or 200.

In operation S340, the client 110 or 200 receives the random number encrypted using the PIN, and encrypts the random number by a symmetric-key algorithm using a client secret key to transmit a resulting random number to the management server 130.

In operation S350, the management server receives the random number encrypted using the client secret key and decrypts the received number using a server secret key and the PIN.

Further, the management server 130 determines the client 110 or 200 that has sent the encrypted random number by interpreting, e.g. a header of the random number, and searches for a PIN previously sent by the corresponding client 110 or 200.

In operation S360, the management server 130 compares a random number before the encryption using the PIN with the decrypted random number. In operation S370, if the two numbers are identical, the management server 130 accepts the access of the corresponding client 110 or 200 so that the corresponding client 110 or 200 can perform the data collection, monitoring and management of the sensor application system.

In operation S380, if the two numbers are not identical, the management server 130 denies the access of the corresponding client 110 or 200.

In the method, client and system for reservation access to a management server using a one-time password, automatic access to a system employing a one-time password authentication method can be made through an arbitrary route according to previously reserved settings to perform information collection and to process specific functions in the case where a system manager is unable to directly access the system through a determined route because of temporal and spatial limitations.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for reservation access to a management server, comprising:
using a one-time password of a sensor application system, which is generated by a client automatically without any intervention of a system manager
transmitting a generated personal identification number (PIN) to the management server when a reservation time comes;
generating, at the management server, a random number encrypted using the PIN, and transmitting the random number to the client;
receiving the random number encrypted using the PIN, encrypting the received random number by a symmetric-key algorithm using a client secret key, and transmitting a random number encrypted using the client secret key to the management server;
receiving, at the management server, the random number encrypted using the client secret key, and decrypting the received random number using a server secret key and the PIN;
comparing a random number before the encryption using the PIN with a decrypted random number, and accepting access of the client if the two numbers are identical; and
updating sensory data values used by the sensor application system periodically,
wherein the client secret key and the server secret key are different keys one of which is used for decryption if the other one is used for encryption.

2. The method of claim 1, wherein the receiving and decrypting comprises:
determining a client that has sent the encrypted random number; and
searching for a PIN previously sent by the determined client.

3. The method of claim 1, wherein the comparing and accepting comprises:
denying access of the corresponding client if the two numbers are not identical.

4. A system for reservation access to a management server using a one-time password, the system comprising:
an authentication server for allocating a one-time password to an individual client by using a personal identification number (PIN) and a client secret key for each client;
a management server for managing a sensor application system by using a board management controller; and
a client for receiving the one-time password from the authentication server to make reservation access to the management server automatically without any intervention of a system manager when a reservation time comes;
wherein the management server receives a server secret key corresponding to the client secret key from the authentication server to accept access of the corresponding client, and
sensory data values used by the sensor application system are updated periodically,
wherein the management server comprises:
a board management controller for performing monitoring, management and control of the sensor application system;
a system interface for providing an input/output interface between the sensor application system and a user;
a random number generator for generating a random number using the PIN for each client provided by the authentication server; and
a cryptographic block for decrypting the random number encrypted using the secret key for each client, by using the PIN and the server secret key.

5. The system of claim 4, wherein the authentication server and the management server are configured as one device or as separate devices.

6. The system of claim 4 wherein the client is a user terminal comprising at least one of a mobile phone, a personal digital assistant (PDA), a portable media player (PMP), a personal computer (PC) And a notebook computer.

7. The system of claim 4, wherein the authentication server comprises:
a cryptographic block for providing the client secret key and the server secret key; and
a PIN generator for generating the PIN for each client.

8. The system of claim 4, wherein the management server further comprises:
a sensor controller for controlling a sensor and a sensor peripheral circuit; and
a data storage for storing data associated with the sensor, the sensor peripheral circuit and the system.

9. The system of claim 7, wherein the PIN generator generates the PIN by referring to periodic data of a sensor, the periodic data including voltage data and time data.

10. A client for reservation access to a management server of a sensor application system using a one-time password, the client comprising:
a personal identification number (PIN) generator for generating a PIN;
a user interface for providing user input/output for the reservation access, management and monitoring;

a cryptographic block for encrypting a random number by a symmetric-key algorithm using a client secret key, the random number being generated from the PIN by the management server; and a board management controller for controlling operations of the PIN generator and the cryptographic block to make reservation access to the management server automatically without any intervention of a system manager through the user interface according to reserved settings, wherein sensory data values used by the sensor application system are updated periodically, and wherein the client secret key and the server secret key are different keys one of which is used for decryption if the other one is used for encryption.

* * * * *